United States Patent [19]

Udagawa

[11] Patent Number: 4,971,338
[45] Date of Patent: Nov. 20, 1990

[54] STEEL LAMINATE GASKET WITH ASSOCIATED BEADS

[75] Inventor: Tsunekazu Udagawa, Ichikawa, Japan

[73] Assignee: Ishikawa Gasket Co., Ltd., Tokyo, Japan

[21] Appl. No.: 419,279

[22] Filed: Oct. 10, 1989

Related U.S. Application Data

[62] Division of Ser. No. 194,376, May 16, 1988, Pat. No. 4,896,891.

[51] Int. Cl.$^5$ .............................................. F16J 15/08
[52] U.S. Cl. .............................. 272/235 B; 277/213; 277/233; 277/235 R
[58] Field of Search ............... 277/235 R, 235 B, 233, 277/336, 207 R, 213

[56] References Cited

U.S. PATENT DOCUMENTS

| | | | |
|---|---|---|---|
| 4,325,559 | 4/1982 | Czernik et al. | 277/235 B |
| 4,351,534 | 9/1982 | McDowell | 277/235 B |
| 4,387,904 | 6/1983 | Nicholson | 277/235 B |
| 4,630,835 | 12/1986 | Locacius | 277/235 B |
| 4,728,110 | 3/1988 | Nakasone | 277/235 B |
| 4,739,999 | 4/1988 | Ishil et al. | 277/236 |
| 4,759,585 | 7/1988 | Ndagawa | 277/236 |
| 4,799,695 | 11/1989 | Yoshiro | 277/235 B |

FOREIGN PATENT DOCUMENTS 954327 4/1964 United Kingdom ............ 277/235 B

Primary Examiner—Allan N. Shoap
Assistant Examiner—Daniel G. DePumpo
Attorney, Agent, or Firm—Kanesaka and Takeuchi

[57] ABSTRACT

A steel laminate gasket of the invention is situated for an internal combustion engine having at least one hole therein. The gasket comprises a first plate having at least one first hole corresponding to the hole of the engine and at least one first bead situated around the first hole, a second plate situated under the first plate, and a support device. The size of the support device is smaller than that of the first bead. The support device is situated beneath the first bead so that when the gasket is tightened, the support device abuts against and supports the first bead. As a result, the gasket can provide strong, even and wide sealing pressure.

4 Claims, 3 Drawing Sheets

STEEL LAMINATE GASKET WITH ASSOCIATED BEADS

This is a division, of application Ser. No. 194,376, filed May 16, 1988 now U.S. Pat. No. 4,896,891.

BACKGROUND OF THE INVENTION AND RELATED ART STATEMENT

The present invention relates to a steel laminate gasket with associated beads for an internal combustion engine.

Efficiency of an engine has increased progressively, and in association therewith, pressure in combustion chamber has increased. As a result, a large amount of pressure is applied to a gasket situated between engine blocks. In order to securely seal between the engine blocks, it is required that the gasket provides strong sealing pressure when the gasket is tightened.

One method for providing high sealing pressure is that a plurality of steel plates with beads therein is laminated vertically. In this case, high sealing pressure is formed only around an area where the beads are located. Since the width of the bead is narrow, a narrow high pressure area is formed.

In Japanese Utility Model Publication No. 62-82462 published on May 26, 1987, a gasket comprises at least three steel plates, wherein upper and lower plates include beads with different sizes, and a middle plate is situated between the upper and lower plates. Since the sizes of the beads are different, the beads provide different sealing pressure at areas around the beads. The beads with different sizes do not cooperate together.

In Japanese Utility Model Publication No. 55-124659 published on Sept. 4, 1980, a gasket comprises at least four plates, wherein two middle plates are provided with beads with the same size. The middle plates are stacked together so that the two beads provide strong pressure when tightened.

Another method for securely sealing around a high pressure area is that an area around the high pressure is widely sealed. In this respect, if the width of a bead is made wide, when the gasket is tightened, the bead may collapse by pressure applied thereto, so that the bead can not provide sufficient and even sealing pressure around the high pressure area.

Therefore, one object of the present invention is to provide a steel laminate gasket which can provide strong, wide and even sealing pressure.

Another object of the invention is to provide a steel laminate gasket as stated above, which can be manufactured simply and economically.

Further objects and advantages of the invention will be apparent from the following description of the invention.

SUMMARY OF THE INVENTION

A steel laminate gasket of the present invention is designed to be installed in an internal combustion engine with at least one hole. The gasket is basically utilized as a cylinder head gasket, but the gasket may be used for other kinds of gaskets.

The gasket of the invention comprises a first plate having at least one first hole corresponding to the hole of the engine and at least one first bead situated around the first hole, a second plate situated under the first plate and having at least one second hole surrounding the hole of the engine, and support means situated beneath the first bead. The size of the support means is smaller than that of the first bead. When the gasket is tightened, the support means abuts against and supports the first bead to thereby provide strong, even and wide sealing pressure on the first bead.

The support means includes at least one second bead to provide resiliency to the first bead when the gasket is tightened. The support means may include a plurality of beads. Preferably, the resiliency of the second bead is greater than that of the first bead. In this respect, in case the first plate and the support means are made of the same material, the second bead of the support means shows the resiliency greater than that of the first bead of the first plate. Also, the resiliency of the second bead may be made greater than the first bead by (1) the thickness of the second bead is made thicker than the first bead, or (2) the second bead is made of a material having resiliency higher than that of the first bead.

In one embodiment, the support means, i.e. second bead, may be integrally formed with the second plate. Also, a pressure regulation plate may be mounted on the first plate without overlapping the first bead. Further, outer plates may be situated outside the first and second plates to protect the first and second plates.

In case the support means is formed separately from the second plate, the support means is mounted on the second plate. Further, it is preferable to place a plate between the first and second plates outside the support means relative to the first hole, the plate operating as a surface pressure regulation plate.

DETAILED DESCRIPTION OF PREFERRED EMBODIMENTS

Figure 1:
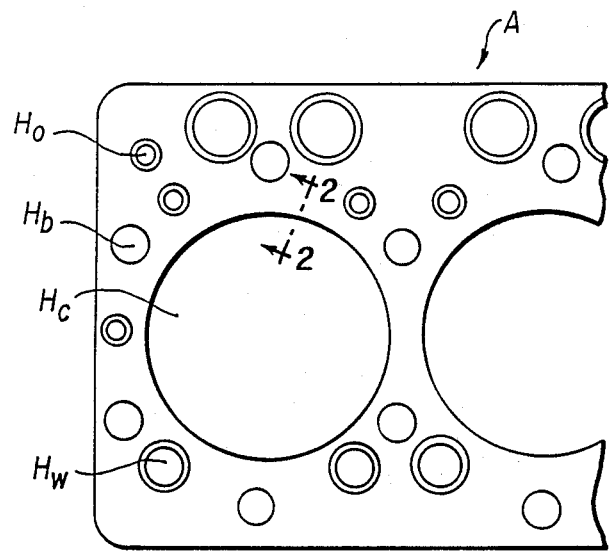
FIG. 1 is a partial plan view of a first embodiment of a steel laminate gasket of the invention.
Figure 2:
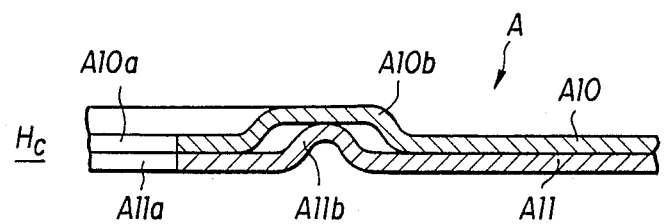
FIG. 2 is an enlarged section view taken along a line 2—2 in FIG. 1.

Referring to FIGS. 1 and 2, a first embodiment A of a steel laminate gasket of the present invention is shown. As in the conventional gasket, the gasket A is provided with cylinder holes Hc, water holes Hw, oil holes Ho and bolt holes Hb. In the gasket A, an area around the cylinder hole Hc is sealed by the specific sealing mechanism of the present invention. However, if required, the sealing mechanism may be employed in other portions, such as around water holes Hw.

As shown in FIG. 2, the gasket A comprises an upper plate A10 and a lower plate A11. The upper plate A10 is provided with a hole A10a for the cylinder hole Hc, and a bead A10b around the hole A10a. The width of the bead A10b is greater than the height of the bead. Namely, the width of the bead A10b is relatively wide.

The lower plate A11 is situated under the upper plate A10. The lower plate A11 is provided with a hole A11a for the cylinder hole Hc, and a bead A11b around the hole A11a. The height of the bead A11b is substantially the same as that of the bead A10b, while the width of the bead A11b is shorter than that of the bead A10b. However, the height of the bead A11b may be shorter than that of the bead A10b.

When the upper and lower plates A10, A11 are assembled, the bead A11b is located in a space under the bead A10b preferably in the middle of the bead A10b.

The bead A11b abuts against the lower surface of the bead A10b.

When the gasket A is situated between a cylinder head and a cylinder block (both not shown) and is tightened, the beads A10b, A11b are compressed. Since the bead A10b is supported by the bead A11b the middle portion of the bead A10b does not dent. When the gasket A is strongly compressed, the bead A10b as well as the bead A11b deform at the same time. The strong and even sealing pressure is formed over the entire area of the bead A10b with an aid of the bead A11b.

In this respect, in case the bead A11b is not situated under the bead A10b, when a high pressure is applied to the bead A10b the middle portion of the bead A10b dents at first. As a result, the bead A10b an not provide even sealing pressure thereon.

In the present invention, since the bead A10b is supported by the bead A11b, the gasket A can provide a strong sealing pressure. Further, since the width of the bead A10b is relatively wide, the gasket A can provide a good sealing ability.

Figure 3:
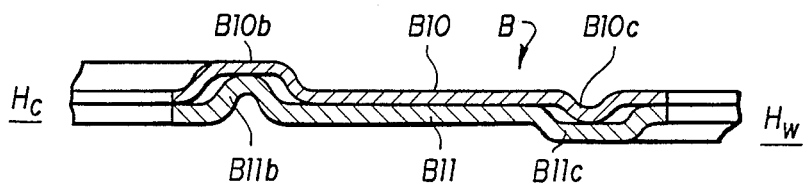
FIGS. 3–11 are section views similar to FIG. 2 for showing second to tenth embodiments of the invention.

FIG. 3 shows a second embodiment B of a steel laminate gasket of the invention. The gasket B comprises an upper plate B10 with a bead B10b and a lower plate B11 with a bead B11b, as in the gasket A.

In the gasket B, however, the upper plate B10 is further provided with a bead B10c extending in the direction opposite to the bead B10b, while the lower plate B11 is further provided with a bead B11c extending in the direction opposite to the bead B11b. The bead B11c is wide as in the bead B10b, and the bead B10c is similar to the bead B11b. The plate B11 is made thicker than the plate B10.

In the gasket B, the water hole Hw is sealed by the similar structure as in the cylinder hole Hc. However, since the plate B11 is made thicker than the plate B10, the sealing pressure at the area around the cylinder hole Hc is stronger than that at the area around the water hole Hw. Namely, the sealing pressure may be determined by selecting the thickness of the plates.

Figure 4:
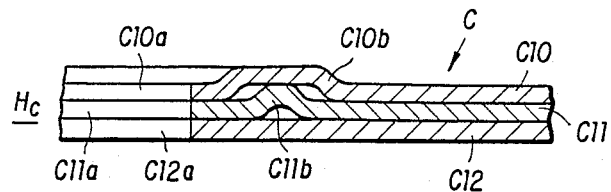

FIG. 4 shows a third embodiment C of a steel laminate gasket of the invention. The gasket C comprises an upper plate C10 with a bead C10b, and a lower plate C11 with a bead C11b, as in the gasket A. However, the gasket C further includes a lower outer plate C12 with a hole C12a corresponding to the holes C10a, C11a. The lower outer plate C12 covers and protects the lower plate C11. The gasket C operates as in the gasket A.

Figure 5:
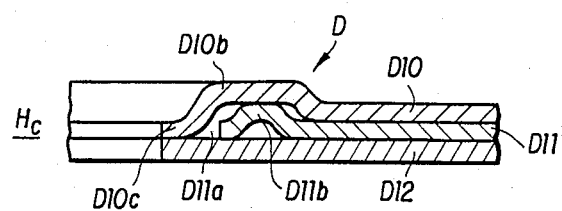

FIG. 5 shows a fourth embodiment D of a steel laminate gasket of the invention. The gasket D comprises an upper plate D10 with a bead D10b, a lower plate D11 with a bead D11b, and a lower outer plate D12.

In the gasket D, however, a hole D11a in the lower plate D11 is made larger than the hole A11a of the gasket A, and an end portion D10c of the upper plate D10 is mounted directly on the lower outer plate D12. Namely, the lower plate D11 is not directly exposed to the cylinder hole Hc. The rest of the structure of the gasket D is the same as the gasket C.

In the gasket D, since the lower plate D11 is not directly exposed to the cylinder hole Hc, the lower plate D11 is protected from high temperature and pressure in the cylinder hole Hc. Therefore, it is possible that the lower plate D11 is made of a material which is not strong against heat but has good compression ability.

Figure 6:
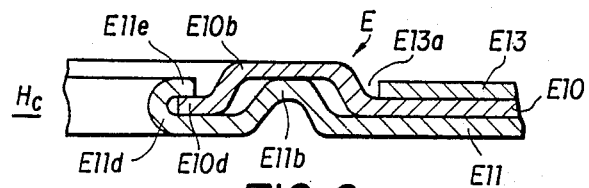

FIG. 6 shows a fifth embodiment E of a steel laminate gasket of the invention. The gasket E comprises a plate E10 with a bead E10b similar to the plate A10, and a plate E11 with a bead E11b similar to the plate A11. The heights of the beads E10b, E11b are made slightly higher than those of the beads A10b, A11b. Further, the gasket E is provided with a plate E13 situated above the plate E10.

In the gasket E, the plate E11 is provided with a curved portion E11d at a portion around the cylinder hole Hc, and a flange E11e situated above an end portion E10d of the plate E10. Therefore, the plate E10 is not directly exposed to the cylinder hole Hc.

The plate E13 is provided with a hole E13a larger than the diameter of the bead E10b. When the plate E13 is mounted on the plate E10, the bead E10b is located in the hole E13a. The plate E13 operates as a surface pressure regulation plate for the bead E10b.

In the gasket E, since the plate E10 is not directly exposed to the cylinder hole Hc, the plate E10 may be made of a material which is not strong against heat but has good compression ability. Further, since the plate E13 operating as a surface pressure regulation plate is mounted on the plate E10, it is possible to control the sealing pressure applied to the beads E10b, E11b.

Figure 7:
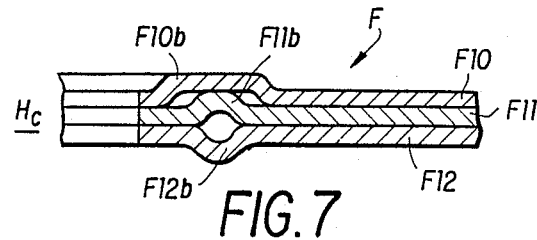

FIG. 7 shows a sixth embodiment F of a steel laminate gasket of the invention. The gasket F comprises an upper plate F10 with a bead F10b, a lower plate F11 with a bead F11b, and a lower outer plate F12, similar to the gasket C. The upper and lower plates F10, F11 are exactly the same as those of the plates C10, C11, but the lower outer plate F12 is different. Namely, the lower outer plate F12 is provided with a bead F12b extending in the direction away from the bead F11b.

In the gasket F, since the plate F12 is provided with the bead F12b, when the gasket F is tightened, a strong sealing pressure is obtained around the cylinder hole Hc. The gasket F is especially useful for an engine with high combustion pressure.

Figure 8:
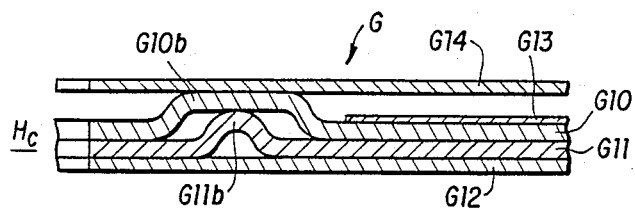

FIG. 8 shows a seventh embodiment G of a steel laminate gasket of the invention. The gasket G comprises an upper plate G10 with a bead G10b, and a lower plate G11 with a bead G11b, as in the gasket A. The gasket G further includes a lower outer plate G12 under the lower plate G11, a plate G13 above the upper plate G10, and an upper outer plate G14 above the plate G13. The plate G13 operates as a surface pressure regulation plate as in the plate E13 of the gasket E.

In the gasket G, since the plate G13 is placed above the upper plate G10, sealing pressure applied to the beads G10b, G11b is controlled. Also, since the outer plates G12, G14 are mounted outside the plates G10, G11, the plates G10, G11 are protected from deformation of the cylinder block and cylinder head when the engine is actuated.

Figure 9:
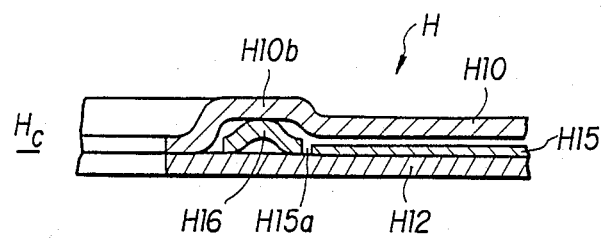

FIG. 9 shows an eighth embodiment H of a steel laminate gasket of the invention. The gasket H comprises an upper plate H10 with a bead H10b, and a plate H12. The gasket H further includes a middle plate H15 with a hole H15a, the diameter of which is substantially the same as that of the bead H10b, and a ring-shape bead H16. The middle plate H15 is located between the upper plate H10 and the plate H12, while the bead H16 is located between the bead H10b and the plate H12 in the hole H15a. The thickness of the plate H15 is thinner than a plate constituting the bead H16. The middle plate H15 operates as a surface pressure regulation plate.

In the gasket H, although the ring-shape bead H16 is formed separately from the middle plate H15, the gasket H seals properly around the cylinder hole Hc. Further, since the thickness of the middle plate H15 is thinner than the plate of the bead H16, when the gasket is tightened, high sealing pressure is formed around the cylinder hole Hc.

Figure 10:
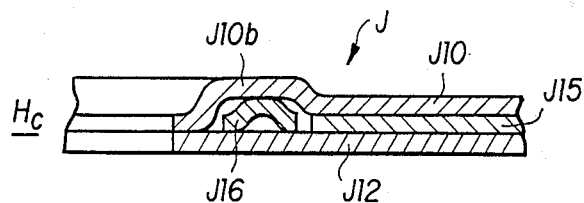

FIG. 10 shows a ninth embodiment J of a steel laminate gasket of the invention. The gasket J comprises an upper plate J10 with a bead J10b, a plate J12, a middle plate J15, and a ring-shape bead J16, as in the gasket H. However, the thickness of the middle plate J15 is thicker than that of the middle plate H15 and is substantially the same as a plate constituting the bead J16. In the gasket J, applicable sealing pressure is less than the gasket H.

Figure 11:
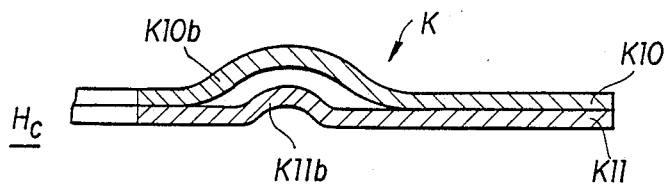

FIG. 11 shows a tenth embodiment K of a steel laminate gasket of the invention. The gasket K comprises an upper plate K10 with a bead K10b, and a lower plate K11 with a bead K11b. The curvature (width and height) of the bead K10b is greater than the curvature of the bead K11b.

In the gasket K, the bead K10b does not have a flat top portion like the bead A10b of the gasket A. Therefore, when the gasket K is tightened or compressed, the bead K10b shows a strong counter reaction more than the bead A10b. Namely, the gasket K provides a strong sealing pressure around the cylinder hole Hc.

In accordance with the present invention, the gasket is provided with an upper plate with a relatively wide bead, and support means situated under the head of the upper plate. The support means may be made integrally with another plate, or independently. Since the bead of the upper plate is resiliently supported by the support means, the gasket can provide strong, even and wide sealing pressure.

While the invention has been explained with reference to the specific embodiments of the invention, the explanation is illustrative and the invention is limited only by the appended claims.

What is claimed is:

1. A steel laminate gasket for an internal combustion engine having at least one hole therein, comprising:

a first plate having at least one first hole corresponding to the hole of the engine, and at least one first bead situated around the first hole, a second plate situated under the first plate and having at least one second hole corresponding to the hole of the engine, and support means integrally formed with the second plate, said support means including at least one second bead smaller in curvature than that of the first bead and being situated beneath the first bead so that when the first and second plates are assembled together, at least one space si formed between an upper surface of the second bead and a lower surface of the first bead, the second bead of the support means, when the gasket is tightened, partly abutting against and supporting the first bead.

2. A steel laminate gasket according to claim 1, wherein said second bead has resiliency greater than that of the first bead.

3. A steel laminate gasket according to claim 2, wherein height of the first bead between an upper surface of the first plate and a top surface of the first bead is higher than height of the second bead between an upper surface of the second plate and a top surface of the second bead.

4. A steel laminate gasket for an internal combustion engine having at least one hole therein, comprising, a first plate having at least one first hole corresponding to the hole of the engine, an edge portion around the first hole, at least one first bead situated around the first hole outside the edge portion, and a main portion located outside the first bead relative to the first hole, and a second plate situated under the first plate and having at least one second hole corresponding to the hole of the engine, an edge portion around the second hole, at least one second bead situated beneath the first bead and having a curvature smaller than that of the first bead so that when the first and second plates are assembled, at least one space is formed between an upper surface of the second bead and a lower surface of the first bead, and a main portion located outside the second bead relative to the second hole, said first and second plates, when assembled, being arranged such that the edge and main portions of the first plate are situated above the respective edge and main portions of the second plate and the first bead is situated above the second bead with said at least one space, and said second bead, when the gasket is tightened, partly supporting the first bead crushed over the second bead to provide wide and even sealing pressure by means of the first and second beads.

* * * * *